United States Patent Office 2,927,481
Patented Mar. 8, 1960

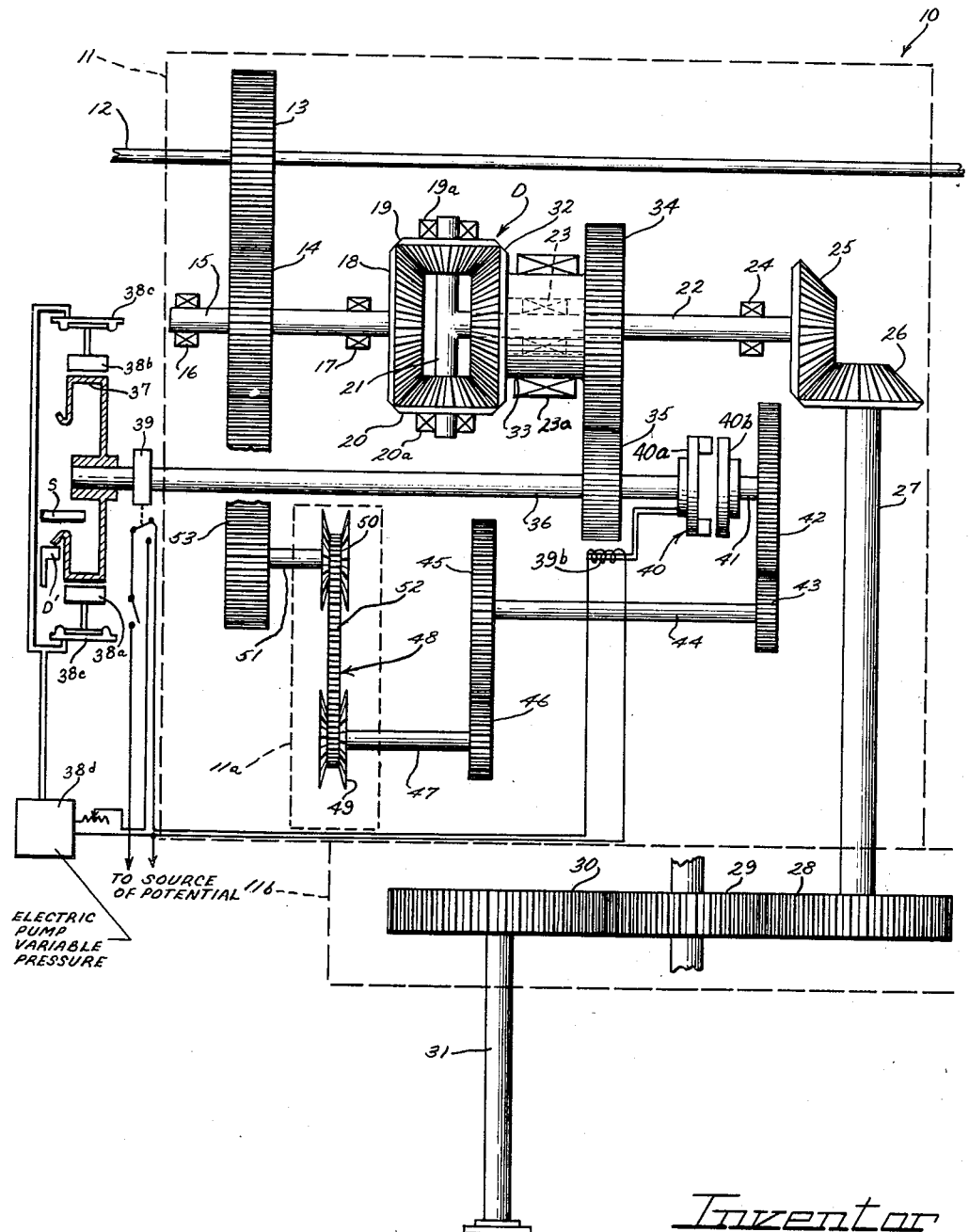

2,927,481

PAPER MACHINE DRIVE

Edward D. Beachler, Beloit, Wis., assignor to Beloit Iron Works, Beloit, Wis., a corporation of Wisconsin Application January 21, 1958, Serial No. 710,325

9 Claims. (Cl. 74—689)

The instant invention relates to a drive mechanism, particularly the drive mechanism for paper making machines, and further more particularly to a means for starting and operating individual sections of a lineshaft driven paper making machine.

Although it will be appreciated that the instant invention may have use in a number of fields, it is particularly useful in paper machine drives. The instant invention overcomes the serious difficulties experienced with clutches in paper machine drives, particularly those which drive dryer sections or calender sections, both of which are characterized by very large inertial loads. As will be appreciated, the starting torques in such paper machine sectional drives are of tremendous magnitude, probably larger than are found in any other industrial machinery. Normally these drives remain connected for long periods of time, but on occasion it becomes necessary to start and stop the machine at frequent intervals. At such times, the heat dissipating ability of any known clutch is insufficient and friction plates, discs, and the like are subject to being destroyed by the heat. This results in a large item of maintenance expense.

The instant invention overcomes many of these difficulties by the arrangement of a differential gear train in combination with a water cooled brake in preference to the usual main friction clutch. A second power train is provided in combination with the water cooled brake for the purpose of introducing a variable speed increment above or below the base speed of the unit. The second power train includes a variable speed unit which introduces a low speed torque into the differential unit by means of a clutch. Because of the low speed in this branch this clutch is called upon to transmit far less power and thus to generate far less heat than the usual main clutch which is omitted. In this invention, the water cooled brake is typically used to start the driven section, and the heat generated during the period that the speeds of the clutch faces are not matched is easily dissipated into circulating cooling water. When the driven section reaches operating speed, the clutch in the second power train is engaged and the brake may be taken out of operation, thereby permitting the speed variation mentioned to be accomplished in the operation of the differential drive.

It is, therefore, an important object to the instant invention to provide an improved paper machine drive mechanism.

Another object of the present invention is to provide a drive mechanism which employs a brake and relatively light-duty clutch in place of a heretofore used relatively heavy-duty clutch.

Yet another object of the present invention is the provision of means for dissipating starting friction of a differential drive assembly at a place where cooling may be efficiently effected.

Another object is to provide a drive mechanism in which smooth controlled starting is possible with the steady acceleration of high inertia rotating loads without recourse to a heavily loaded clutch wherein both members rotate and are therefore difficult to cool adequately.

An additional object is to provide a drive mechanism whereby a heavy load may be accelerated to its rated speed expeditiously, but without causing an overload to the drive mechanism itself.

Many other advantages, features and additional objects of the present invention will become manifest to those versed in the art upon making reference to the detailed description and the accompanying drawing in which a preferred structural embodiment incorporating the principles of the present invention is shown by way of illustrative example.

The instant drawing is a top plan view, with parts shown diagrammatically, of a paper machine drive mechanism embodying the principles of the instant invention.

On the drawing, the reference numeral 10 indicates generally a drive mechanism for a typical paper machine section comprising a gear housing 11, mounting thereon a variable speed drive housing 11a, and mounting adjacent thereto a transfer gear train housing 11b (all of such housings being indicated diagrammatically only by heavy dashed lines).

A rotating source of power or driven lineshaft 12 extends the full length of the paper machine, being arranged for mounting in and through each of several sectional drive units 10. The housing 11 encloses a portion of the lineshaft 12 which corotatably mounts a gear 13. The gear 13 meshes with and drives a second gear 14 corotatably mounted on a shaft 15 that is mounted for rotation on a pair of bearings 16 and 17 (shown diagrammatically). For the sake of clarity and simplicity, most of the bearings within the housing 11 have been omitted, and those that are shown are indicated diagrammatically only.

The shaft 15 corotatably mounts the first of three rotary elements of a differential gearing assembly indicated generally by the reference numeral D. This first rotary element is a bevel gear 18. The shaft 15 and the gear 18 comprise one branch of a divided power train.

The second rotary element in the differential gearing assembly D comprises opposed beveled pinions 19 and 20 rotatably and bearingly carried on a pinion carrier, frame or rack 21 by means of a pair of bearings 19a and 20a, and which pinions are each meshed with the beveled gear 18. The frame 21 integrally joins with a shaft 22 to form a T-shaped arrangement whereby the pinions 19 and 20 are rotatably carried at extremities of the arms of the T which in turn are rotatable about the stem or shaft 22 of the T.

As will be noted, the stem or shaft 22 is mounted for rotation on bearings 23 and 24, and the shaft 22 corotatably carries a pinion or bevel gear 25 that meshes with and drives a pinion or bevel gear 26 corotatably carried on still another shaft 27. The pinion carrier 21, the shaft 22, the gears 25 and 26, and the shaft 27 comprise an output train of the drive.

Power is transmitted from the shaft 27 directly, (and not through a clutch) to a series of transfer gears 28, 29 and 30 to the load on a shaft 31. Further details of the gear train 28, 29 and 30, and the load shaft 31 are not necessary for the purposes of the instant invention, but it is sufficient to know that this transfer gear arrangement is old and well known in the art.

As will be noted, the gears 19 and 20 mesh with a beveled gear 32 which forms the third rotary element of the differential gear assembly D. The beveled gear 32 is corotatably mounted on a hollow shaft or sleeve 33, which is mounted for rotation on a pair of bearings 23 and 23a, and which sleeve corotatably carries another gear 34, which may be termed a control gear. The gear 34 meshes with a gear 35 mounted on a separate control shaft 36. The shaft 36 carries a hollow water-cooled brake drum 37 at one extremity thereof outside of the housing 11 and the water-cooled brake drum is mounted for frictional cooperation with a pair of brake shoes 38a and 38b of suitable friction material. The shoes are connected to motors or actuators 38c, e.g., of the fluid type, which are under the control of an electrically operated pump 38d. As indicated diagrammatically, a source S of cool water feeds water to the brake drum 37 and a drain D' receives heated water from the brake drum 37.

As will be appreciated, water cooling arrangements for the brake shoes 38a, 38b may be employed. The important feature with respect to the instant invention here is that substantial amounts of water or other cooling fluid may be employed to control the temperature of the brake 37, 38 and to prevent overheating of equipment. This is not the case inside of the housing 11, wherein complicated bearing arrangements and the like make water cooling practically impossible. For this reason, the brake 37, 38 is preferably mounted outside of the housing 11 and preferably an appreciable distance therefrom so as to permit the proper functioning of the water cooling arrangement. The gears 32, 34 and 35 and the brake 37 may be termed as a control train.

A second branch of the divided power train is also driven by the gear 14 and includes a gear 53 drivably meshing therewith. The gear 53 is broken in the drawing to avoid confusion with the shaft 36. The gear 53 is corotatably carried on an input shaft 51 of a variable speed-ratio drive element 48 shown diagrammatically within the housing 11a.

The structural details of the variable speed-ratio drive element 48, all contained within the housing 11a, do not form a part of the instant invention. However, a preferred embodiment of this invention includes a stepless variable speed unit or element having a pair of pulley wheels 49 and 50 of variable effective diameter with either smooth or toothed contact surfaces or faces drivingly engaged by an endless flexible belt or chain 52 of appropriate construction, and more preferably includes the positively engaging type employing the toothed contact surfaces. Reference may be had to U.S. Patent No. 2,329,911 and to other patents referenced therein for further teaching relative to this type of apparatus.

The variable speed-ratio drive element 48 has an output shaft 47 on which a gear 46 is corotatably mounted. The gear 46 meshes with a larger gear 45 to effect a speed reduction, e.g., 2:1. The gear 45 and a smaller gear 43 are corotatably carried on a shaft 44. The gear 43 meshes with a larger gear 42 to effect a second speed reduction, e.g. 2:1. The gear 42 and one side or driving element 40b of a relatively small clutch 40 are corotatably carried on a shaft 41.

The clutch 40 includes a further side or driven element 40a corotatably carried by the shaft 36. In this embodiment, the clutch 40 is shown to be of the electrically actuated type. It will be appreciated that detailed internal means are well known in the art for actuating and deactuating a clutch, and therefore a more detailed internal clutch showing is not needed.

Thus the gears 32, 34 and 35 are common to both the control train and the second branch of the divided power train.

The clutch 40 and the brake shoes 38a and 38b are under the operative control of a centrifugal switch 39, the internal details of which do not form a part of this invention. The switch 39 is also known in the instant art as a "plugging switch." It will be appreciated that means are well known in the art that are responsive to the rate of rotation of a shaft or the stopping of rotation thereof, and therefore a more detailed internal showing is unnecessary.

Referring now to the operation of the drive mechanism 10, various advantageous features thereof will become apparent. The device, as drawn, represents the idle or at-rest condition wherein the clutch 40 and the brake-drum 37 are respectively disengaged.

Initially, the lineshaft 12 is driven rotatably whereby the gear 18 or first element is driven through the gears 13, 14. Thus the first branch of the divided power train is immediately driven by and with the lineshaft 12.

The high inertia load, being connected to the output train, e.g. one of the shafts 22, 27, or 31, prevents the pinion carrier 21 or second element from turning whereby the pinions 19 and 20 are rotated only on their own axes by the gear 18. The rotation of the pinions 19 and 20 causes the gear 32 or third element of the differential gear to rotate, and with it the gear 34 driving the gear 35, the shaft 36, the driven portion 40a of the clutch 40, and the brake drum 37. The components of the mechanism 10 thus placed into rotation offer negligible load or resistance to rotation.

When several drive mechanisms 10 are used to drive several paper machine sections, any one drive mechanism may be allowed to run in the foregoing manner until it is desired to place the section with which it is associated into operation.

In order to start rotation of the output train (and load), a braking torque is applied to the drum 37 by causing the brake shoes 38a, 38b, to be forced against the brake drum 37. The braking torque may be limited and regulated by controlling the fluid pressure supplied to the actuators 38c, in order to thus regulate the speed at which the section is accelerated, and to prevent the overloading of the gears in the first branch of the power train, the control train, and the output train.

Heat is developed by the frictional slippage between the brake drum 37 and the brake shoes 38a, 38b, which heat flows to the circulating water which is drained away.

The braking torque applied to the brake drum 37 is transferred through the gears 34 and 35 to the control gear 32. This torque opposes the relatively free rotation of the pinions 19 and 20, and the carrier 21 is thereby compelled to rotate. The braking may be continued until the brake drum is brought to a full stop, thereby simultaneously bringing the output train and load up to speed.

Thus an advantageous structure may be provided wherein the second branch of the divided power train and the clutch 40 are omitted, such structure being characterized by having a fixed speed ratio between the lineshaft 12 and the output shaft 27 when the brake is locked.

A more advantageous structure, however, includes these elements.

In the illustrated embodiment, with the output train at rest, the gear 34 rotates at the speed of the lineshaft 12, while the gear 35 rotates at a somewhat higher speed, e.g. twice the lineshaft speed.

With the gears 14 and 53 of equal size, and with the variable speed-ratio element 48 set to a 1:1 ratio, the gear 46 also rotates at the lineshaft speed. Thus when two 2:1 step downs are provided in the second branch of the power train, the clutch element 40b rotates at one-fourth of lineshaft speed while the clutch element 40a rotates at twice lineshaft speed, there being no braking, but in the opposite direction. It can also be seen that if a reversing gear were added to either branch, since speed of the element 40a can be reduced to a standstill, there is thus a point at which the clutch elements rotate at the same speed in the same direction.

The centrifugal or plugging switch 39 may be selected or adjusted to operate at any speed, e.g. when the shaft 36 comes to substantially a full stop or when the clutch elements 40a and 40b are rotating at the same speed. The switch 39 acts to release the brake shoes 38a and 38b and simultaneously to energize or engage the clutch 40.

It will be appreciated, once the load shaft 27 is approximately up to the desired speed, much less torque is required to control the rotation of the rotary gear 32 in the differential gearing assembly D. With engagement of the clutch 40, the second branch of the input power train applies a torque through the clutch 40, and the gear 35 which drives the gears 34 and 32. As illustrated, the torque from the second branch is in the same direction of rotation as is the pinion carrier 21 and the shaft 22.

Typically available variable speed-ratio elements 48 are capable of doubling or halving their input speed to produce an output speed twice to one-half of the input speed, and have negligible usefulness outside this range of speed ratios. Thus, the clutch element 40b in this embodiment may be rotated at a relatively-variable speed with respect to the line shaft speed, which speed is a fraction between one-half and one-eighth of the lineshaft speed.

When the variable increment of torque is in the same direction as the carrier 21, this torque effects a variable additive increment of speed at the load shaft 27. If a reversing gear be provided, the variable increment of torque is in the direction opposite to the rotation of the carrier 21, and a variable subtractive increment of speed is effected at the load shaft 27.

It is thus apparent that the brake herein provided is operative to accelerate the connected load and not to decelerate it.

To shut down or stop the driven load, it is merely necessary to de-energize or disengage both the clutch and the brake.

It will be apparent that the clutch may be located in any of the shafts in the second branch of the power train, e.g. the shaft 47. An advantage to such an installation is that such location would facilitate disposing the clutch 40 outside of the housing 11 whereby any wear debris from the clutch would be excluded from the housing 11, and any gear lubricant would be excluded from the faces of the clutch 40. Of course, suitable shielding (not shown) may also be provided to effect these results.

Although various minor modifications might be suggested by those versed in the art, it should be understood that I wish to embody within the scope of the patent warranted hereon all such embodiments as reasonably and properly come within the scope of my contribution to the art.

I claim as my invention:

1. In a paper machine, a driven lineshaft member, a driving member drivingly connected to a section of the paper machine, a differential gearing assembly having three rotary elements, the first of said elements being drivably connected to said lineshaft member, the second of said elements being drivingly connected to said driving member, and the third of said elements being a control element, a brake drivingly and rigidly connected to said control element, a clutch having one side drivingly and rigidly connected to said control element, means selectively actuating said clutch and said brake, and means actuated by said lineshaft member and drivingly connected to the other side of said clutch for driving said control element to impart, via said differential gearing assembly, to said driving member a controlled speed creating a speed differential between said members.

2. In a paper machine, a driven lineshaft member, a driving member drivingly connected to a section of the paper machine, a differential gearing assembly having three rotary elements, the first of said elements being drivably connected to said lineshaft member, the second of said elements being drivingly connected to said driving member, and the third of said elements being a control element, a brake drivingly and rigidly connected to said control element, a clutch having one side drivingly and rigidly connected to said control element, means selectively actuating said clutch and said brake, a variable speed-ratio element having a rotatable input shaft and a rotatable output shaft, said output shaft being mounted to drive said control element through the other side of said clutch, said output shaft being driven via said lineshaft member, for creating a variable speed differential between said members.

3. In a paper machine, a driven lineshaft member, a driving member drivingly connected to a section of the paper machine, a housing, a differential gearing assembly within the housing having three rotary elements, the first of said elements being drivingly connected to said lineshaft member, the second of said elements being drivingly connected to said driving member, the third of said elements being a control element, a control shaft drivingly connected to said control element and extending outside the housing, a brake drivingly and rigidly connected to said control shaft outside said housing, liquid cooling means for said brake, a clutch having one side drivingly and rigidly connected to said control shaft, means selectively actuating said clutch and said brake, and means actuated by said lineshaft member and drivingly connected to the other side of said clutch for driving said control element to impart, via said differential gearing assembly, to said driving member a controlled speed creating a speed differential between said members.

4. In a paper machine, a driven lineshaft member, a driving member drivingly connected to a section of the paper machine, a housing, a differential gearing assembly within the housing having three rotary elements, the first of said elements being drivably connected to said lineshaft member, the second of said elements being drivingly connected to said driving member, the third of said elements being a control element, a control shaft drivingly connected to said control element and extending outside the housing, a brake drivingly and rigidly connected to said control shaft outside said housing, liquid cooling means for said brake, a clutch having one side drivingly and rigidly connected to said control shaft within the housing, a variable speed-ratio element having a rotatable input shaft and a rotatable output shaft, said output shaft being mounted to drive said control element through the other side of said clutch, said input shaft being driven via said lineshaft member, for creating a variable speed differential between said members.

5. In a paper machine, a driven lineshaft member, a driving member drivingly connected to a section of the paper machine, a differential gearing assembly having three rotary elements, the first of said elements being drivably connected to said lineshaft member, the second of said elements being drivingly connected to said driving member, a clutch having one side drivingly and rigidly connected to the third of said elements, and means actuated by said lineshaft member and drivingly connected to the other side of said clutch for driving said third element to impart, via said differental gearing assembly, to said driving member a controlled speed creating a speed differential between said members.

6. A drive mechanism for transferring power from a rotating source of power to a rotatable load comprising in combination: a differential gearing assembly having three rotary elements, the first of said elements being drivably connected to the source of power, the second of said elements being drivingly connected to the load, and the third of said elements being a control element; a brake drivingly and rigidly connected to said control element; a clutch having one side drivingly and rigidly connected to said control element; means selectively actuating said brake and said clutch; and means actuated by said source of power and drivingly connected to the other side of said clutch for driving said control element to impart, via said differential gearing assembly, to said load a controlled speed creating a speed differential between the source of power and the load.

7. A drive mechanism for transferring power from a rotating source of power to a rotatable load comprising in combination: a differential gearing assembly having three rotary elements, the first of said elements being drivably connected to the source of power, the second of said elements being drivingly connected to the load; a clutch having one side drivingly and rigidly connected to the third of said elements; and means actuated by said source of power and drivingly connected to the other side of said clutch for driving said third element to impart, via said differential gearing assembly, to said load a controlled speed creating a speed differential between said source of power and said load.

8. A drive mechanism for transferring power from a rotating source of power to a rotatable load comprising in combination: a housing; a differential gearing assembly within said housing and having three rotary elements, the first of said elements being drivably connected to the source of power, the second of said elements being drivingly connected to the load, and the third of said elements being a control element; a rotatable brake drum drivingly and rigidly connected to said control element and spaced exteriorly from said housing, said brake drum being internally adapted to continually retain a cooling liquid and being vented to give off vapors of the liquid; and means for selectively applying a drag to said brake drum to stop rotation of said control element to thereby rotatably drive the load.

9. A drive mechanism for transferring power from a rotating source of power to a rotatable load comprising in combination: a differential gearing assembly having three rotary elements, the first of said elements being drivably connected to the source of power, the second of said elements being drivingly connected to the load, and the third of said elements being a control element; a brake drivingly and rigidly connected to said control element; a clutch having one side drivingly and rigidly connected to said control element; means for actuating said brake and said clutch, said means including switch means responsive to the rotation of said brake, said one side of the clutch, and said control element and operative at a predetermined speed thereof to effect release of said brake and engaging of said clutch while power is being delivered to said load; and means actuated by said source of power and drivingly connected to the other side of said clutch for driving said control element to impart, via said differential gearing assembly, to said load a controlled speed creating a speed differential between the source of power and the load.

References Cited in the file of this patent

UNITED STATES PATENTS

| | | |
|---|---|---|
| 1,155,124 | Berger | Sept. 28, 1915 |
| 1,194,107 | Whiteside | Aug. 8, 1916 |
| 1,963,308 | Molinelli | June 19, 1934 |
| 2,555,016 | Trofimov | May 29, 1951 |
| 2,665,787 | Ribich | Jan. 12, 1954 |
| 2,803,315 | McPhee et al. | Aug. 20, 1957 |